US012808729B2

(12) United States Patent
Ichihashi et al.

(10) Patent No.: US 12,808,729 B2
(45) Date of Patent: Nov. 24, 2026

(54) FIBER OPTIC TEMPERATURE PROBE FOR TEMPERATURE LIMITING APPLICATIONS

(71) Applicant: Photon Control Inc., Richmond (CA)

(72) Inventors: Yoshua Ichihashi, Richmond (CA); Michael Feaver, Richmond (CA); Florin Constantin Cioata, Surrey (CA); Hari Kishore Ambal, San Jose, CA (US); Yi Liu, Richmond (CA); Alborz Amini, Vancouver (CA)

(73) Assignee: Photon Control Inc., Richmond (CA)

( * ) Notice: Subject to any disclaimer, the term of this patent is extended or adjusted under 35 U.S.C. 154(b) by 896 days.

(21) Appl. No.: 18/049,379

(22) Filed: Oct. 25, 2022

(65) Prior Publication Data

US 2023/0066887 A1 Mar. 2, 2023

Related U.S. Application Data

(63) Continuation of application No. PCT/CA2021/050858, filed on Jun. 22, 2021.

(Continued)

(51) Int. Cl.
*G01K 11/32* (2021.01)
*G01K 1/143* (2021.01)
*H05B 1/02* (2006.01)

(52) U.S. Cl.
CPC .............. *G01K 11/32* (2013.01); *G01K 1/143* (2013.01); *H05B 1/0202* (2013.01)

(58) Field of Classification Search
CPC .... G01K 1/143; G01K 11/32; G01K 11/3213; H05B 1/0202
See application file for complete search history.

(56) References Cited

U.S. PATENT DOCUMENTS 4,437,772 A * 3/1984 Samulski ............... G01K 1/024 374/E1.004
4,652,143 A * 3/1987 Wickersheim ..... G01K 11/3213 374/161

(Continued)

FOREIGN PATENT DOCUMENTS

| | | | |
|---|---|---|---|
| EP | 0567158 | A2 | 10/1993 |
| JP | 2018151199 | A2 | 9/2018 |
| JP | 2020085508 | A | 6/2020 |

OTHER PUBLICATIONS

International Search Report issued in corresponding PCT Application No. PCT/CA2021/050858; search completed Sep. 14, 2021.

(Continued)

*Primary Examiner* — Randy W Gibson
(74) *Attorney, Agent, or Firm* — Edward Scott Trask

(57) ABSTRACT

An optical temperature sensing system is disclosed which includes a fiber optic sensor as a primary temperature sensor for reading a temperature of a measured object or a measured environment. The temperature probe is coupled to a converter which generates using solid-state electronic components without software, a temperature output. A temperature sensing system is also disclosed that includes a temperature sensor for reading a temperature of a measured object, and a dual converter module comprising a first converter to provide a primary temperature sensor signal, and a second converter to generate a secondary temperature sensor signal from a signal provided by the first converter. An optical temperature sensor is also described, with a conversion module that generates an output that mimics the output of a thermistor or a thermocouple.

23 Claims, 13 Drawing Sheets

Related U.S. Application Data

(60) Provisional application No. 62/705,323, filed on Jun. 22, 2020.

(56) References Cited

U.S. PATENT DOCUMENTS

| | | | | | |
|---|---|---|---|---|---|
| 4,708,494 | A * | 11/1987 | Kleinerman | G01J 5/0846 374/161 |
| 4,710,033 | A * | 12/1987 | Hirano | G01K 11/3213 356/44 |
| 4,789,992 | A * | 12/1988 | Wickersheim | G01K 11/3213 374/161 |
| 5,255,980 | A * | 10/1993 | Thomas | G01K 11/20 374/161 |
| 6,997,606 | B2 * | 2/2006 | Marinet | G01K 15/00 327/512 |
| 10,481,017 | B2 | 11/2019 | Zinn et al. | |
| 11,057,967 | B2 * | 7/2021 | Wu | H05B 6/68 |
| 2006/0067379 | A1 | 3/2006 | Djeu | |
| 2019/0132909 | A1 | 5/2019 | Wu et al. | |

OTHER PUBLICATIONS

Office Action report issued in JP counterpart application No. 2022-578852 dated May 8, 2025 (7 pages).

Grattan K.T.V. and Palmer, A.W.; A Fibre Optic Temperature Sensor Using Fluorescent Decay, Proc. SPIE 0492, 1984 European Conf on Optics, Optical Systems and Applications, (Mar. 27, 1985); https://doi.org/10.1117/12.943772.

* cited by examiner

FIBER OPTIC TEMPERATURE PROBE FOR TEMPERATURE LIMITING APPLICATIONS

CROSS REFERENCE

This application is a Continuation of PCT Application No. PCT/CA2021/050858 filed Jun. 22, 2021, which claims priority to U.S. Provisional Application No. 62/705,323, filed Jun. 22, 2020; the contents of both applications being incorporated herein by reference in their entirety.

TECHNICAL FIELD

The following relates to fiber optic temperature probes for temperature-limiting applications.

BACKGROUND

Thermocouples and thermistors are common types of temperature sensors used for temperature-limiting applications. Numerous control systems have been designed to accept the output of a thermocouple or thermistor as feedback, both to regulate and limit temperature. Both thermocouples and thermistors are electrical, and their wires act as antennas when exposed to radio frequency (RF) or other fields, which makes the signals output by these sensors noisy, often inaccurate, and, in the case of high RF fields (such as those in some semiconductor processes employing plasma), a safety hazard to the operator due to large induced voltages.

Redundant temperature sensors may be required to ensure safety specifications are met for "over temperature" conditions in systems that use an active temperature control of heaters. For example, the semi S2 requirements standard may require compliant systems to ensure that no failure mode exists that could lead to an inability to detect an unsafe conditions without redundancy. Various other standards, such as IEC 60730-1 or UL60730-1 (superseding UL873), may require similar or other types of redundancy. Over temperature specifications typically require that there exist no single point failure modes. That is, the device may be outside of an acceptable range and not report the temperature, which is deemed to be okay. Under temperature failure modes are also typically acceptable though not desired.

SUMMARY

Applications that require active heating and are exposed to RF through, e.g., plasma generation, such as plasma deposition processes, may benefit from fiber optic technology to ensure accurate temperature measurement for closed-loop control. The fiber optic technology may be used in conjunction with a secondary sensor to provide measurements for over temperature conditions.

Traditionally, when two temperature channels are required to provide redundant temperature sensing, these channels are provided using thermocouples or thermistors, with one as back up for the other. While fiber optic sensors have been used for control functions, they have not been used as temperature limiting sensors on account of requiring safety-rated software or safety-rated solid-state electronics to conform to the applicable safety standards. This can be seen as a drawback since optical sensors are not subject to the same inaccuracies and noise when placed in an electric field when compared to thermocouples or thermistors.

An optical sensor with an output mimicking the output of a thermocouple or thermistor can be used in their place to provide more accurate feedback to control systems in noisy electrical environments, without requiring additional changes or retrofitting to the control system. In addition, using only solid-state devices or safety-rated software, the device can be designed to meet established safety standards for temperature-regulating devices. Moreover, such standards are more readily met using an analog design since programmable devices typically increase the cost of obtaining certification for the device.

In one aspect, there is provided a temperature sensing system comprising a phosphor based fiber optic sensor as a primary temperature sensor for reading a temperature of a measured object, and a secondary redundant temperature sensor connected to an over temperature protection circuit.

In another aspect, there is provided a temperature sensing system comprising a temperature sensor for reading a temperature of a measured object, and a dual converter module comprising a first converter to provide a primary temperature sensor signal, and a second converter to generate a secondary temperature sensor signal from a signal provided by the first converter.

In yet another aspect, there is provided an optical temperature sensor with a conversion module that generates an output that mimics the output of a thermistor or a thermocouple.

In yet another aspect, an optical temperature sensor system for detecting a temperature in an environment is disclosed. The optical temperature sensor system includes a temperature probe comprising a fiber optic temperature sensor, and a convertor to generate a temperature output using solid-state electronic components without software. In example embodiments, the fiber optic temperature sensor generates a signal in response to sensing the temperature of the environment. The signal fluctuates according to a decay rate responsive to the temperature. The convertor includes a signal processing system including solid-state electronics configured to transform the signal into an intermediate signal representative of the decay rate by comparing one or more signal properties to one or more expected signal properties, and convert the intermediate signal into a temperature output by comparing the intermediate signal to an expected decay rate associated with reference temperatures.

In example embodiments, the temperature output is in a form of an output of a thermocouple or a thermistor.

In example embodiments, the fiber optic sensor is a phosphor based or a GaAs based fiber optic sensor.

In example embodiments, the signal processing system comprises a logarithmic amplifier configured to transform the signal into the intermediate signal having a rate of change inversely proportional with the decay rate. In example embodiments, the signal processing system comprises one or more comparators configured to generate one or more pulses in response to the intermediate signal crossing one or more thresholds, the temperature output is generated based on the decay rate observed between the one or more pulses. In example embodiments, the signal processing system comprises a discrete non-volatile memory which converts the intermediate signal into the temperature output based on a pre-programmed conversion.

In example embodiments, the system further includes a secondary temperature sensor configured to generate a further signal in response to sensing the temperature of the environment, wherein the further signal is provided to the temperature limiting protection circuit as a redundant temperature reading.

In yet another aspect, a optical temperature sensor system for detecting a temperature in an environment is disclosed.

The system includes a temperature probe comprising a fiber optic temperature sensor and a convertor to generate, separately by two or more readout electronics in parallel, a first temperature output and a second temperature output based on a signal from the fiber optic temperature sensor.

In example embodiments, the two or more readout electronics in parallel are solid-state electronic components without software.

In example embodiments, the first temperature output or the second temperature output are indicative of an over-temperature condition.

In example embodiments, the first temperature output or the second temperature output are indicative of a fault condition.

In example embodiments, at least one of the two or more readout electronics includes programmable hardware.

In example embodiments, the first temperature output or the second temperature output is in a form of an output of a thermocouple or a thermistor. In example embodiments, the first temperature output or the second temperature output is a K type thermocouple voltage value.

In example embodiments, the temperature probe contains a single thermally conductive tip single probe to measure a surface temperature of an object in the environment.

In example embodiments, the temperature probe is housed inside a sheath to measure the temperature inside a liquid or gas.

In yet another aspect a system, for sensing a temperature of an object is disclosed. The system includes a fiber optic temperature sensor generating a signal in response to sensing the temperature, the signal fluctuating according to a decay rate responsive to the temperature, and a redundant temperature sensor configured to generate a redundant signal in response to sensing the temperature. The system further includes a signal processing system configured to transform the signal into an intermediate signal representative of the decay rate by comparing one or more signal properties to one or more expected signal properties and convert the intermediate signal into a temperature output based on comparing the intermediate signal to an expected decay rate. The signal processing system outputs the redundant signal and/or the temperature output to the temperature limiting protection circuit.

In example embodiments, the signal processing system consists of one or more solid state components.

In example embodiments, the fiber optic temperature sensor and the redundant temperature sensor are within a single probe.

In example embodiments, the fiber optic temperature sensor and the redundant temperature sensor are housed inside a single thermally conductive tip of the single probe to measure a surface temperature of the object.

In example embodiments, the fiber optic temperature sensor and the redundant temperature sensor are housed inside a single sheath to measure the temperature inside a liquid or gas.

In example embodiments, the temperature output is a K type thermocouple voltage value.

In example embodiments, the fiber optic temperature sensor is a phosphor based or a GaAs based fiber optic sensor.

In example embodiments, the redundant temperature sensor is a phosphor based or a GaAs based fiber optic sensor.

In example embodiments, the redundant temperature sensor is a thermocouple or thermistor, and the signal processing system comprises a programmable memory used to convert the signal into the temperature output.

In example embodiments, the programmable memory includes one or more parameters and/or calibration values associated with one or more of the object and the redundant temperature sensor.

In yet another aspect, a heating system is disclosed comprising a heating element coupled to a heating element controller, a temperature probe comprising a fiber optic temperature sensor, and a convertor. The converter generates a first temperature output based on a signal from the temperature probe using solid-state electronic components without software, generates a second temperature output based on processing the signal with one or more memories and outputs the first temperature output and second temperature output to the heating element controller. The heating element controller adjusts the operation of the heating element based on the received first temperature output and second temperature output.

In example embodiments, the heating element is a radio frequency heater powered by a radio frequency power supply, and the first temperature output is a UL listed or IEC 61508 programmable readout interpretable by the heating element controller.

BRIEF DESCRIPTION OF THE DRAWINGS

Embodiments will now be described with reference to the appended drawings wherein.

DETAILED DESCRIPTION

Figure 1:
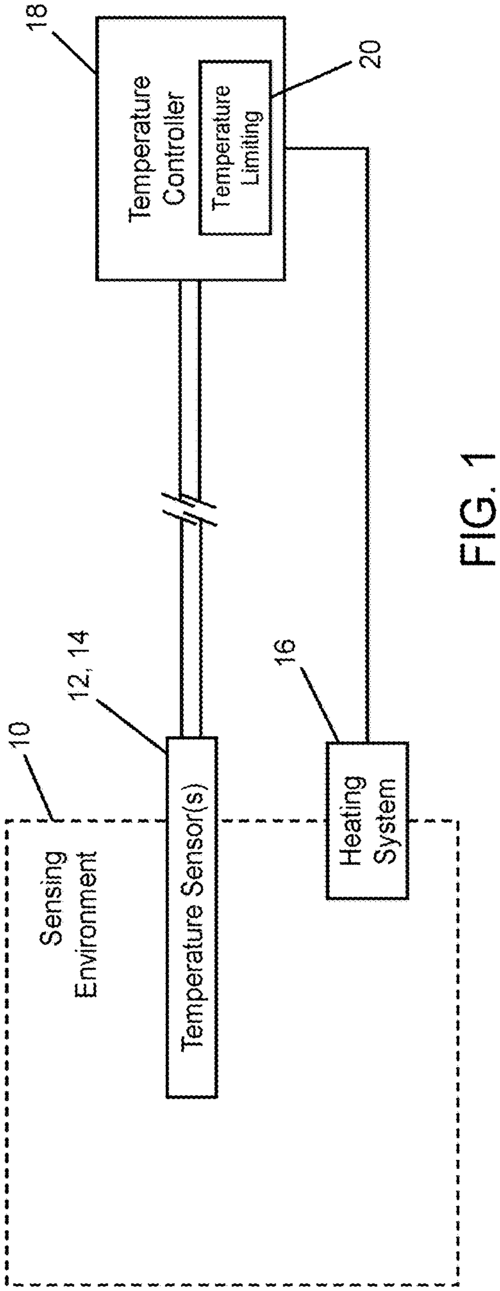
FIG. 1 is a schematic block diagram of a temperature sensing environment and temperature controller for controlling a heating system in such environment.

Turning now to the figures, FIG. 1 illustrates an example of a sensing environment 10 in which a heating system 16 is providing heat to an object for which a temperature measurement is desired, e.g., a semiconductor showerhead, pedestal, or electrostatic chuck (ESC). One or more temperature sensors 12, 14 are used to measure the temperature of the object being measured, e.g., during an application that requires active heating, exposed to RF through, e.g., plasma generation, such as a plasma deposition process. The temperature sensors 12, 14 are coupled to a temperature controller 18, which is used to control the heating system 16 coupled to, or positioned within, the sensing environment 10. One of the temperature sensors 12, 14 is used for a safety critical function or application. For example, the temperature sensors 12, 14 may be used by a temperature limiting function 20 of temperature controller 18.

Figure 2:
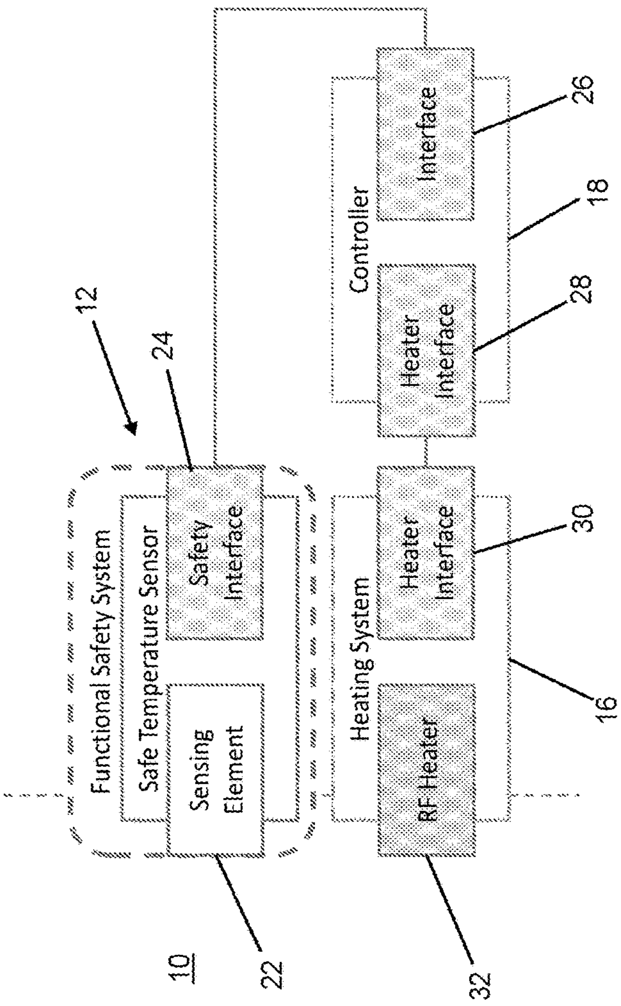
FIG. 2 is a schematic block diagram of a functional safety system for a fiber optic temperature sensor and temperature controller.

FIG. 2 illustrates a first safe temperature sensor 12 that defines a functional safety system for sensing temperature in the environment 10. The safe temperature sensor 12 includes a sensing element 22 (e.g., phosphor based, or Gallium Arsenide (GaAs) based element) that is positioned to measure a temperature in the environment 10 and a safety interface 24 that is configured to be coupled to a controller interface 26 of the temperature controller 18. The controller 18 also includes a heater interface 28 that is coupled to a corresponding heater interface 30 of the heating system 16. The heating system 16 also includes, in this example, an RF heater 32 that is positioned to act as a source of heat in the environment 10.

To provide redundancy or to provide primary and secondary temperature sensing roles, more than one temperature sensor 12, 14 can be used in an application within the environment 10. In the examples provided herein a first temperature sensor 12 refers to the above-noted "safety" sensor, that is configured to provide reliability as a primary objective; and a second temperature sensor 14 refers to another temperature sensor whose primary objective is not necessarily reliability (e.g., accuracy) and thus can be used for other, non-safety critical functionality. As described herein, the first temperature sensor 12 can include an optical sensor with an output mimicking the output of a thermocouple or thermistor to provide more accurate feedback to control systems in noisy electrical environments 10 (by using the optical sensor), without requiring additional changes to the control system. The second temperature sensor 14 can also include an optical sensor and take advantage of software for calibration and calculating temperature.

Figure 3A:
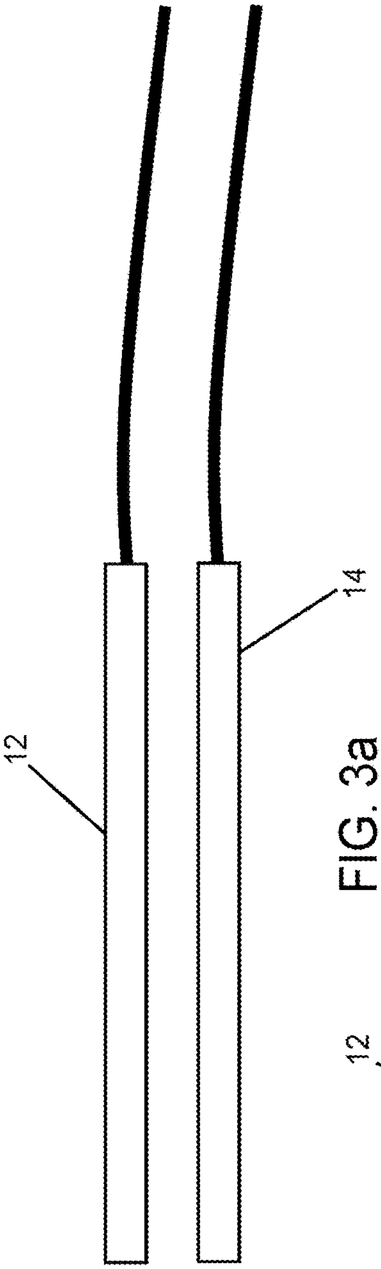
FIG. 3*a* is a block diagram illustrating an independent dual temperature probe configuration.
Figure 3B:
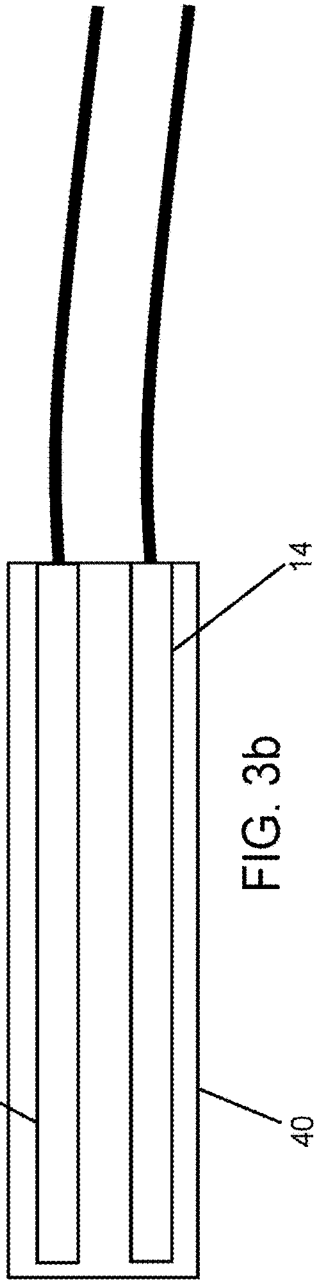
FIG. 3*b* is a block diagram illustrating a combined dual temperature probe configuration.
Figure 3C:
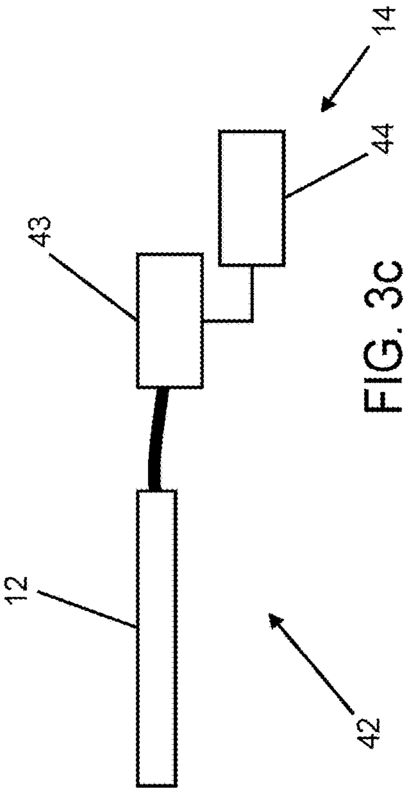
FIG. 3*c* is a block diagram illustrating a single probe, single optical fiber, dual conversion module configuration.

FIGS. 3*a*, 3*b*, and 3*c* show example configurations for obtaining first and second temperature signals, at least one of which provides an input to a safety critical function, such as for temperature limiting within the environment 10. In FIG. 3*a*, the first temperature sensor 12 is provided using a separate temperature probe from the second temperature sensor 14. That is, the first and second temperature sensors 12, 14 can themselves be packaged as separate independent probes that are coupled to the temperature controller 18 (not shown in FIG. 3*a*). In FIG. 3*b*, the first and second temperature sensors 12, 14 are packaged together in a combined temperature probe 40. In FIG. 3*c* (greater details shown in FIG. 5), the first temperature sensor 12 is provided using a single probe 42, and a first temperature conversion module 43 feeds data obtained from the probe 42, to a secondary temperature conversion module 44 that includes hardware and/or software configured to provide the second temperature signal thus operating as the second temperature sensor 14.

Figure 4A:
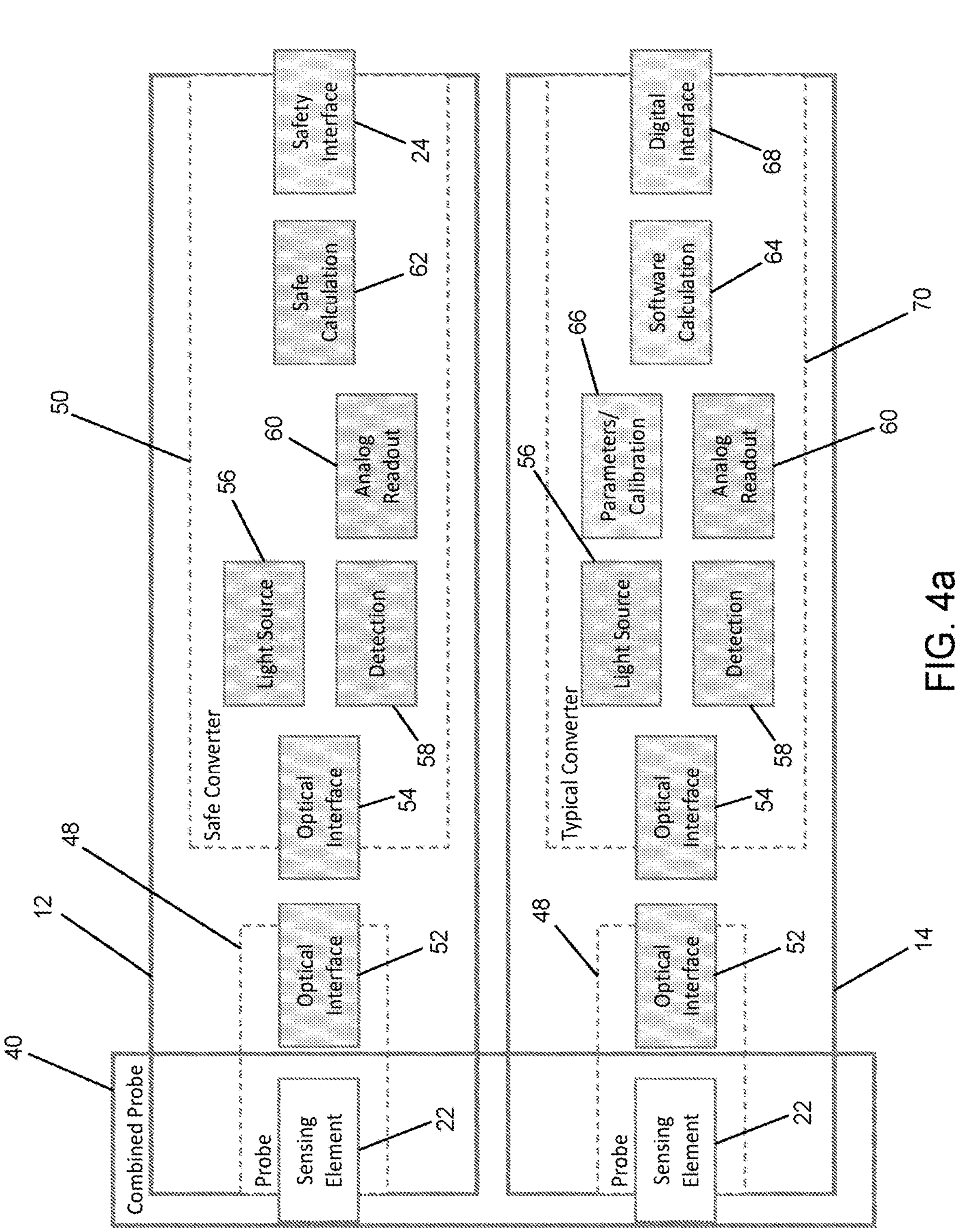
FIG. 4*a* is a schematic block diagram illustrating further detail of the configuration shown in FIG. 3*b*.

Turning now to FIG. 4*a*, a combined temperature probe 40 is shown with additional detail. The combined probe 40 can include a housing or other physical structure that holds, contains or otherwise aligns the first and second temperature sensors 12, 14 to independently measure the temperature of a target surface, area, or volume. In this example configuration, the first temperature sensor 12 includes a sensing probe 48 and a safe converter 50, which is used to generate a signal for the safety-critical function such as the temperature limiting function 20. The sensing probe 48 includes the sensing element 22 and a probe optical interface 52 that optically communicates with a converter optical interface 54 of the safe converter 50. The safe converter 50 includes a light source 56 that generates light to be sent to the sensing element 22, which generates a return signal that varies according to temperature and is detected by a detection element 58. The detection element 58 generates an analog readout 60 that is used by a safe calculation element 62 to generate a safety signal (e.g., logic signal or other desired analog or digital output), for example, one that mimics the output of a thermistor or thermocouple and thus can be sent via the safety interface 24 to the interface 26 of the temperature controller 18.

As described below, the safe calculation element 62 is used to overcome the problems of electrical noise present in some safety-rated thermocouple and thermistor based temperature limiting devices, and to provide electrical hazard mitigation, by employing a fiber optic temperature sensor 12 with electronics that can generate a signal similar to a thermocouple or thermistor so that fiber optic sensing can be used in their place. The safe calculation element 62 can be configured to use only solid-state electronics, or use safety-rated software that complies with regulations and specifications associated with a temperature limiting application.

The second temperature sensor 14 shown in FIG. 4*a* includes a sensing probe 48 and a typical converter 70, which can utilize any suitable and available technology that does not necessarily need to meet safety critical specifications. For example, the typical converter 70 can employ software and calibration algorithms to focus on temperature accuracy over suitability for safety certification. The sensing probe 48 includes a sensing element 22 and a probe optical interface 52 that optically communicates with a converter optical interface 54, similar to the arrangement for the first temperature sensor 12. The typical converter 70 also includes a light source 56, detection element 58 and analog readout 60. The typical converter 70 can utilize stored parameters and/or calibration values 66 and employ a software calculation element 64 to generate a temperature signal for a digital interface 68. The digital interface 68 can be used to connect the second temperature sensor 14 to a control or monitoring function.

Figure 4B:
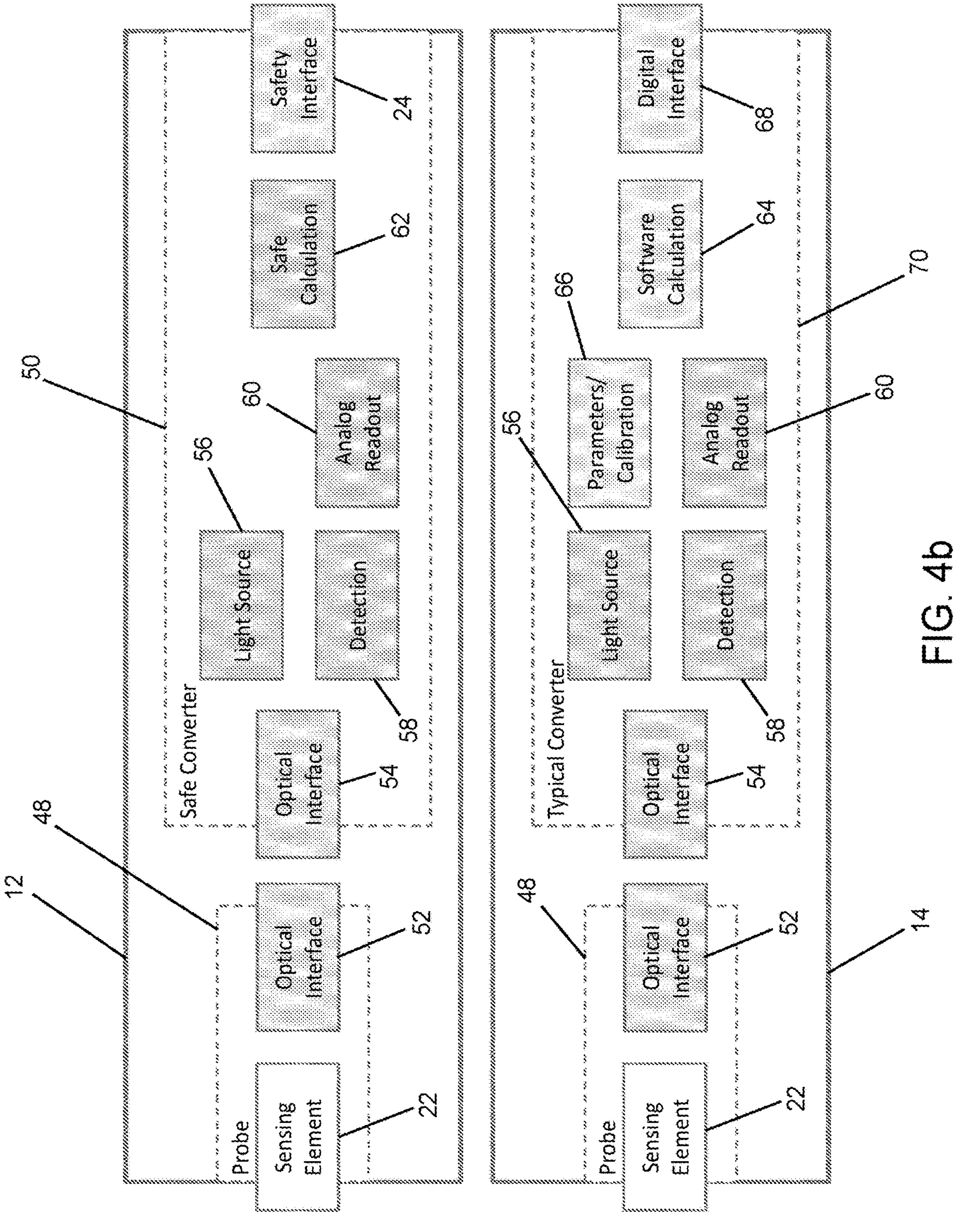
FIG. 4*b* is a schematic block diagram illustrating further detail of the configuration shown in FIG. 3*a*.

FIG. 4*b* is identical to the configuration shown in FIG. 4*a* except the temperature sensors 12, 14 are provided by separate probes 48 rather than a combined probe 40 or structure that physically couples the probes 48. The choice between configurations shown in FIGS. 4*a* and 4*b* can be made according to regulatory or application specific requirements or limitations on packaging.

Figure 5:
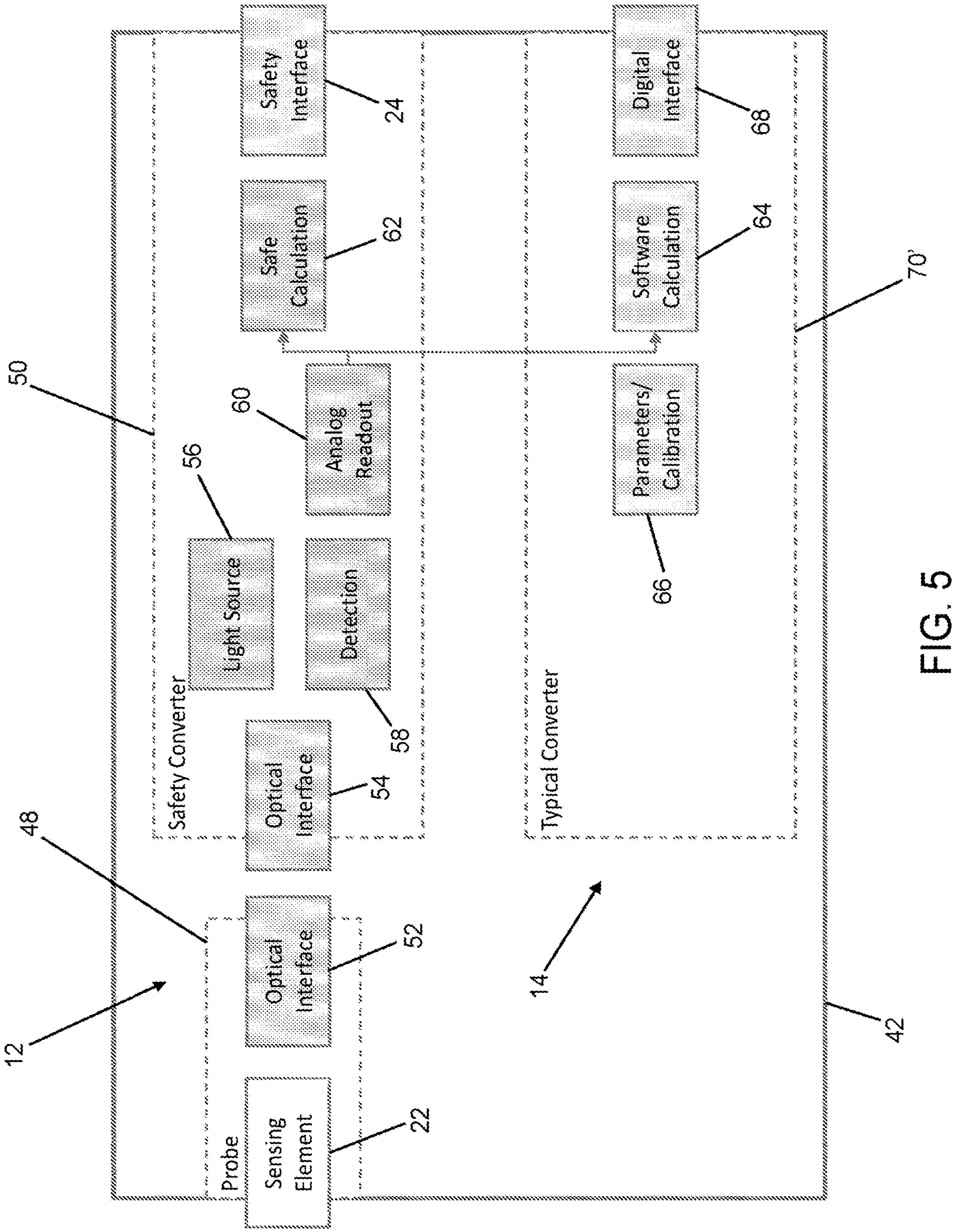
FIG. 5 is a schematic block diagram illustrating further detail of the configuration shown in FIG. 3*c*.

FIG. 5 illustrates a single probe combined sensor 42. In this "hybrid" configuration, a single probe 48 with sensing element 22 and optical interface 52 interfaces with the safety converter 50 in the same way as that shown in FIGS. 4*a* and 4*b*. However, in this configuration, the analog readout 60 is fed not only to the safe calculation element 62 but also to the software calculation element 64 of a typical converter 70' that is modified to leverage the analog readout 60 in this way. Here, the software calculation element 64 receives the output of the analog readout 60, also used by the safety converter 50 and the parameters/calibration values 66 to generate a software-based digital temperature signal that can be fed to the digital interface 68.

Figure 6:
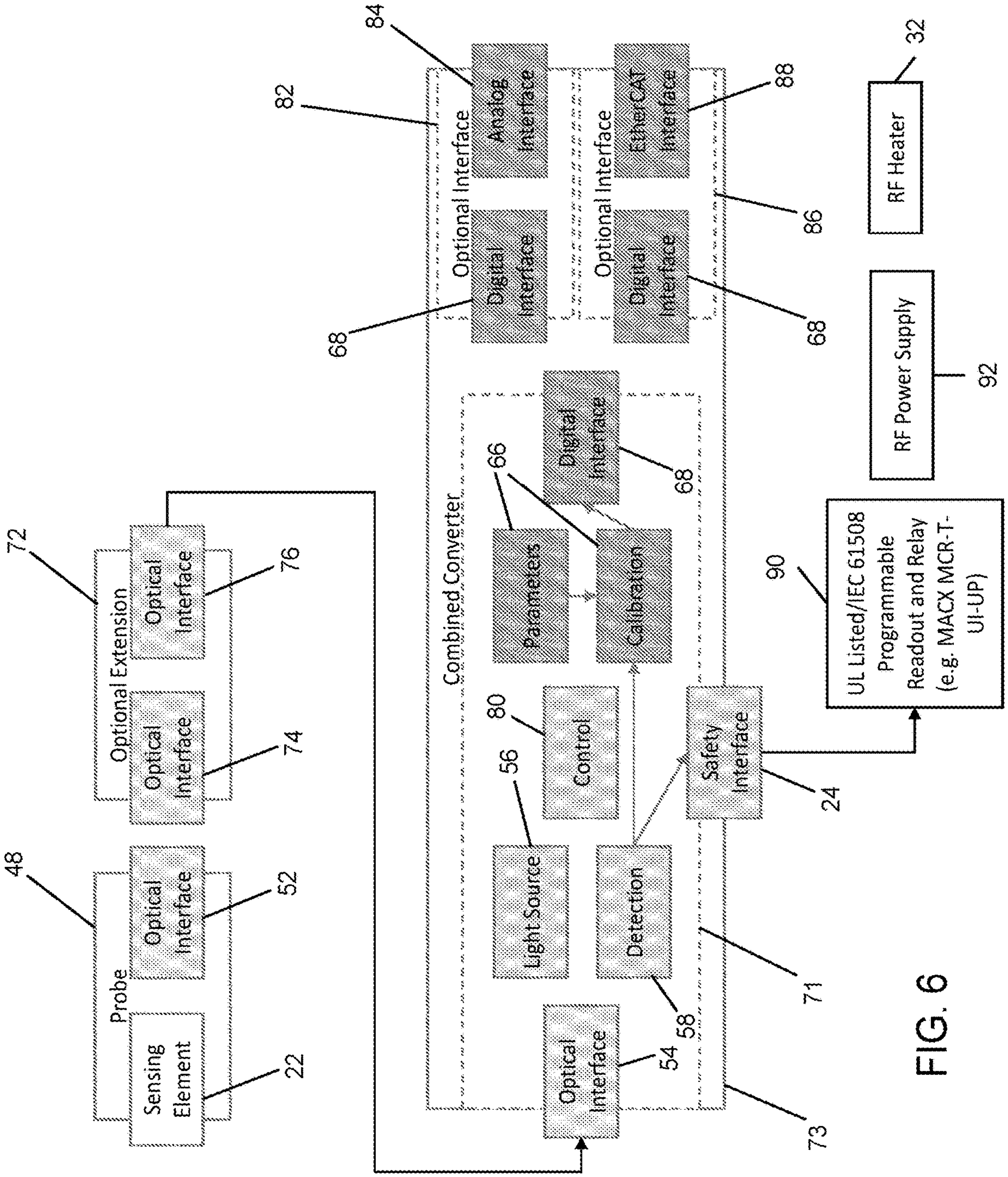
FIG. 6 is a schematic block diagram illustrating a single probe multi-channel configuration.

FIG. 6 illustrates yet another configuration in which a single fiber optic probe 48 is used to perform temperature sensing using a combined converter 71. In this example configuration, the probe optical interface 52 optically communicates with the converter optical interface 54 via an optional extension cable 72. The extension cable 72 includes a pair of optical interfaces 74, 76. The extension cable 72 can be optionally used to provide a longer reach for the probe 48 relative to a housing 73 for the combined converter 71. The combined converter 71 includes the light source 56, detection element 58, safety interface 24 and digital interface 68. A control module 80 is also used to provide feedback to the light source 56, which excites the phosphor sensing element. The control module 80 can be used to control the transimpedance gain of the detected light (LED) current levels, or other optical parameters of the excitation and detection functions. The output of the detection element 58 is fed to both a calibration module 66 to generate the digital temperature signal for the digital interface 68 and to the safety interface 24 to enable the combined converter 71 to be used with, in this example, a UL listed or IEC 61508 programmable readout and relay 90 for controlling an RF power supply 92 for the RF heater 32. Also shown in FIG. 6 are optional interfaces 82, 86, with digital interfaces 68, an analog interface 84, and an EtherCAT interface 88, by way of example only.

Figure 7:
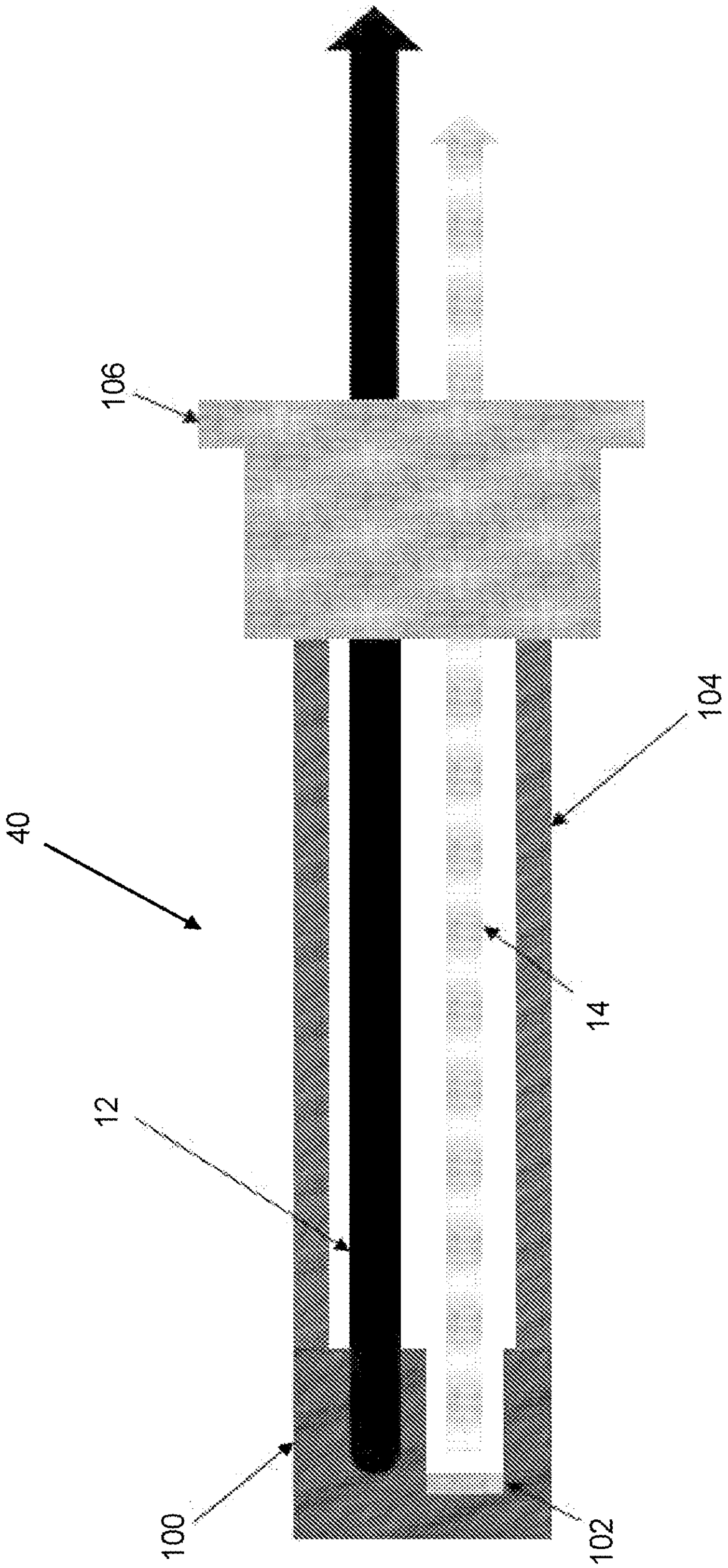
FIG. 7. is a cross-sectional view of a combined sensor probe with primary and second temperature channels.
Figure 8:
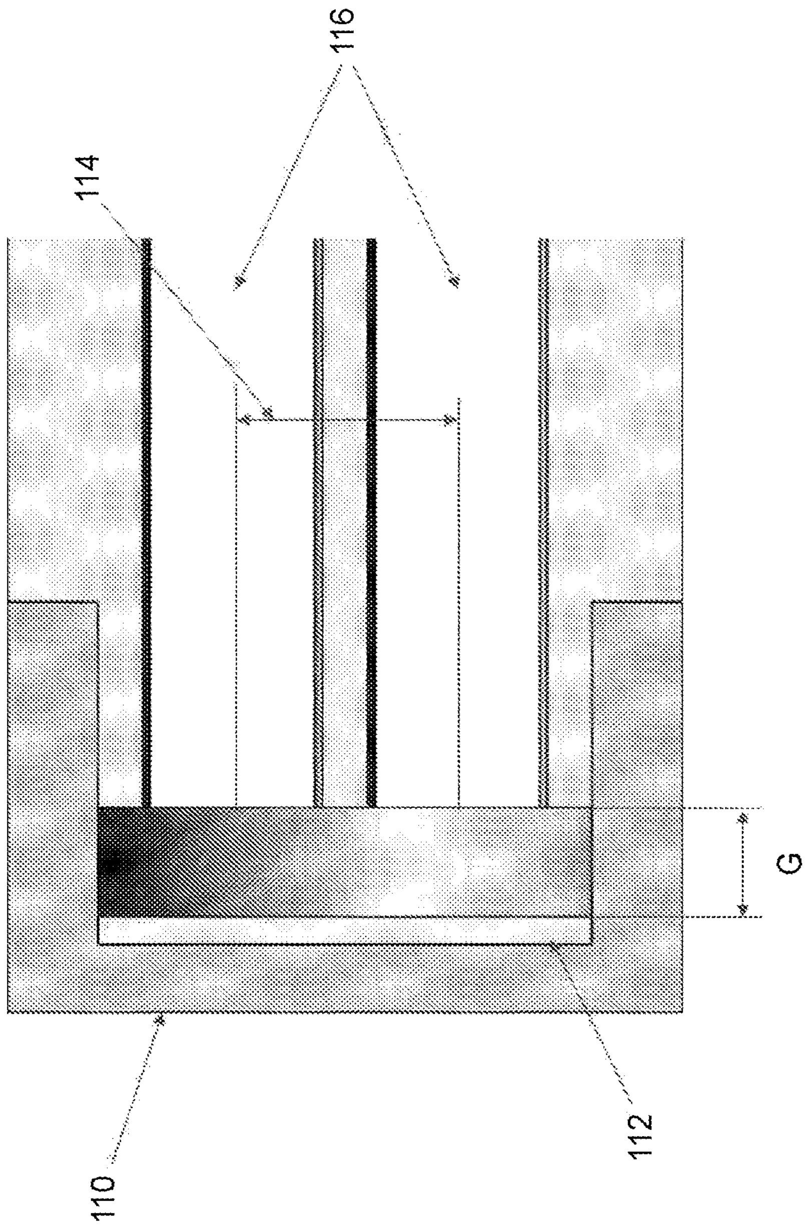
FIG. 8 is an enlarged cross-sectional view of a sensing tip for a dual temperature sensor probe.
Figure 9:
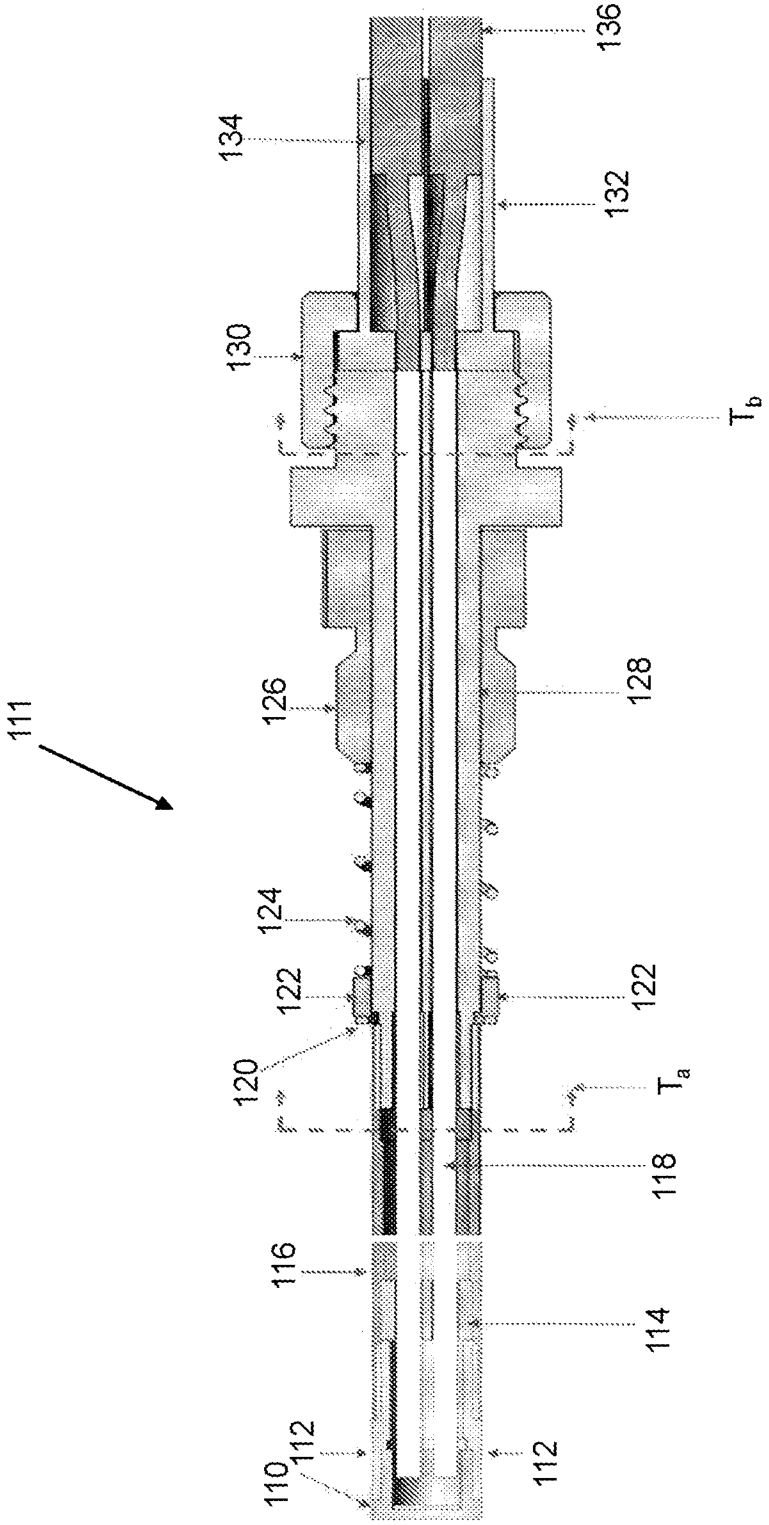
FIG. 9 is a cross-sectional view of a dual temperature sensor probe.

Turning now to FIGS. 7-9, example configurations for a combined temperature probe are shown. In FIG. 7, a dual sensing tip 100 includes a sensing element 102 for the second temperature sensor 14 and can embed any other suitable sensing element for the first temperature sensor 12, used for redundancy and/or for temperature limiting functionality. It can be appreciated that the first and second temperature sensors 12, 14 can be swapped in other embodiments, e.g., to use a phosphor sensing element 102 for the first temperature sensor 12. The dual sensing tip 100 is coupled to the end of a probe shaft 104, which extends from a probe mount 106. In example embodiments, the dual sensing tip 100 can include a first traditional temperature sensor 12 (e.g., comprising a thermistor and/or thermocouple), and a second optical temperature sensor 14, where the thermistor and/or thermocouple of the first traditional sensing element 102 may be used for over temperature detection by sensing voltage without changes to account for the second optical temperature sensor 14.

FIG. 8 illustrates a dual fiber sensing tip 110 with a single sensing element 112 that can be used by a pair of optical fibers mounted in parallel channels 116 positioned to provide a separation 114 between the fibers. As also seen in FIG. 8, the sensing tip 110 can also provide a gap G between the sensing element 112 and the ends of the fibers positioned in the channels 116.

FIG. 9 illustrates an example of a combined optical fiber probe 111 that incorporates the dual sensing tip 110. In this example, the sensing tip 110 is supported at the end of a leading shaft 112. The leading shaft 112 is connected to a fiber rod 118 via a rod retainer 114 and modular tube 116, e.g., a stainless steel tube (SST). In front of the fiber rod 118 a relatively hotter area can be tolerated and beyond line identified as $T_a$, a relatively cooler temperature is tolerated, e.g., below 200° C. The probe 111 includes a rear shaft 128 that extends through a mount nut 126, washer 122 and clip 120 to attach to the fiber rod 118. A spring 124 can be interposed between the washer 122 and mount nut 126 to provide some resilience in the probe 111. The rear shaft 128 can also be threadingly received by a holder 130 to connect the probe 111 to a fiber optical cable adaptor 132 that carries a pair of optical fibers 134, 136 to a housing or device coupled to the probe 111. In this example, the interface between the rear shaft 128 and holder 130 can tolerate a relatively lower temperature $T_b$.

Figure 10:
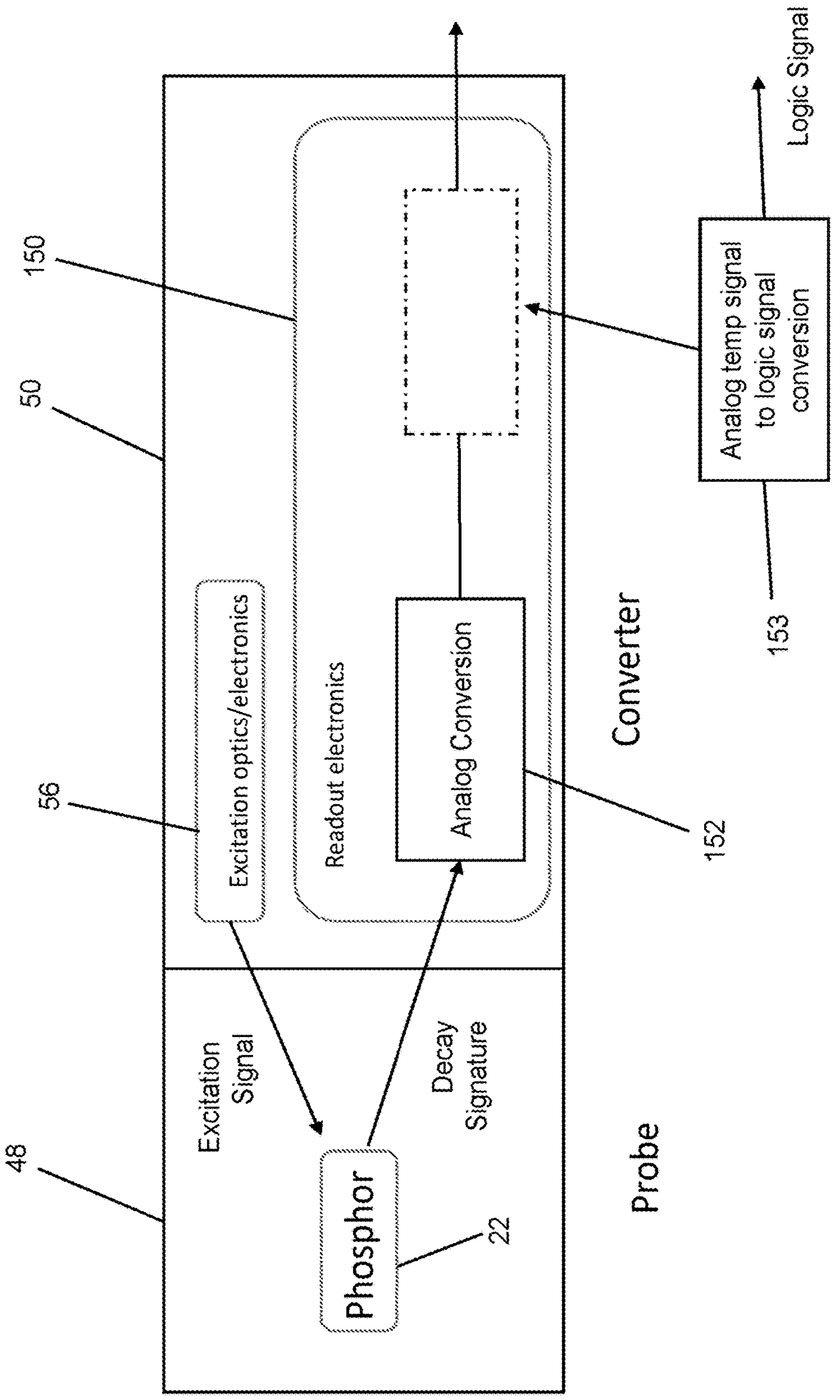
FIG. 10 is a schematic diagram for a safe temperature analog conversion from an optical signal.
Figure 11A:
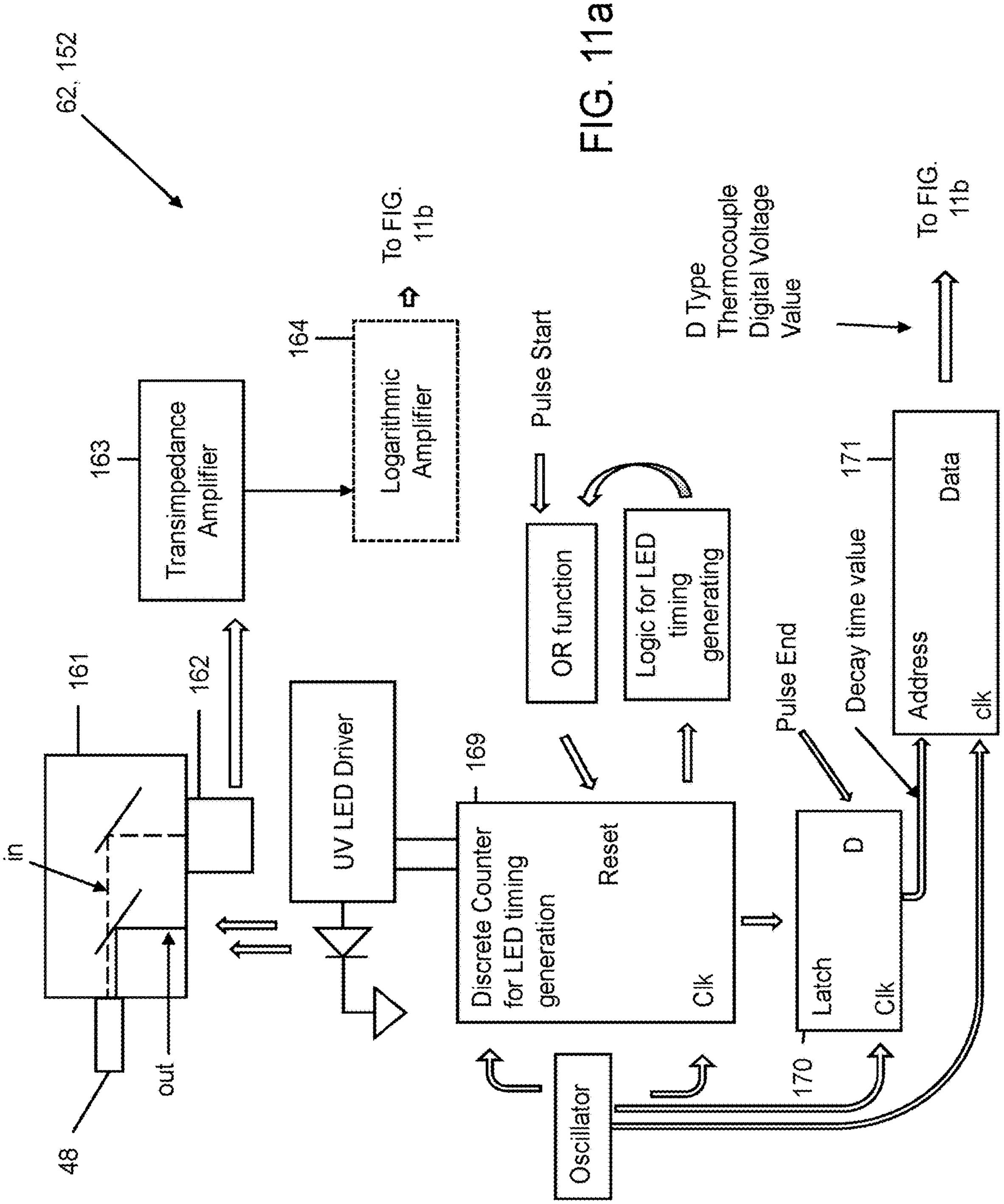
FIGS. 11*a* and 11*b* are an example of a block diagram for a safe temperature conversion using a fiber optic temperature sensor input.
Figure 11B:
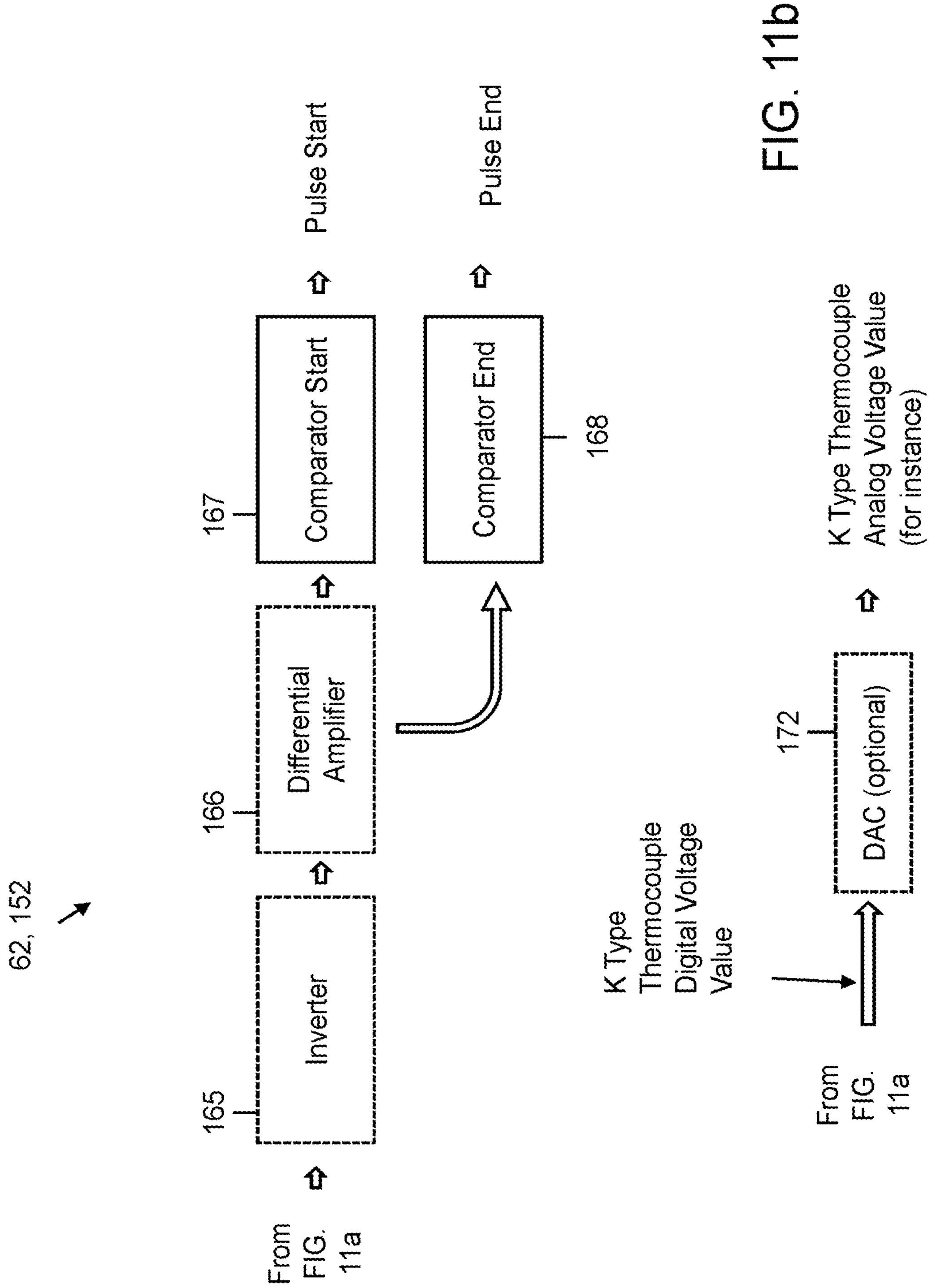
Figure 12:
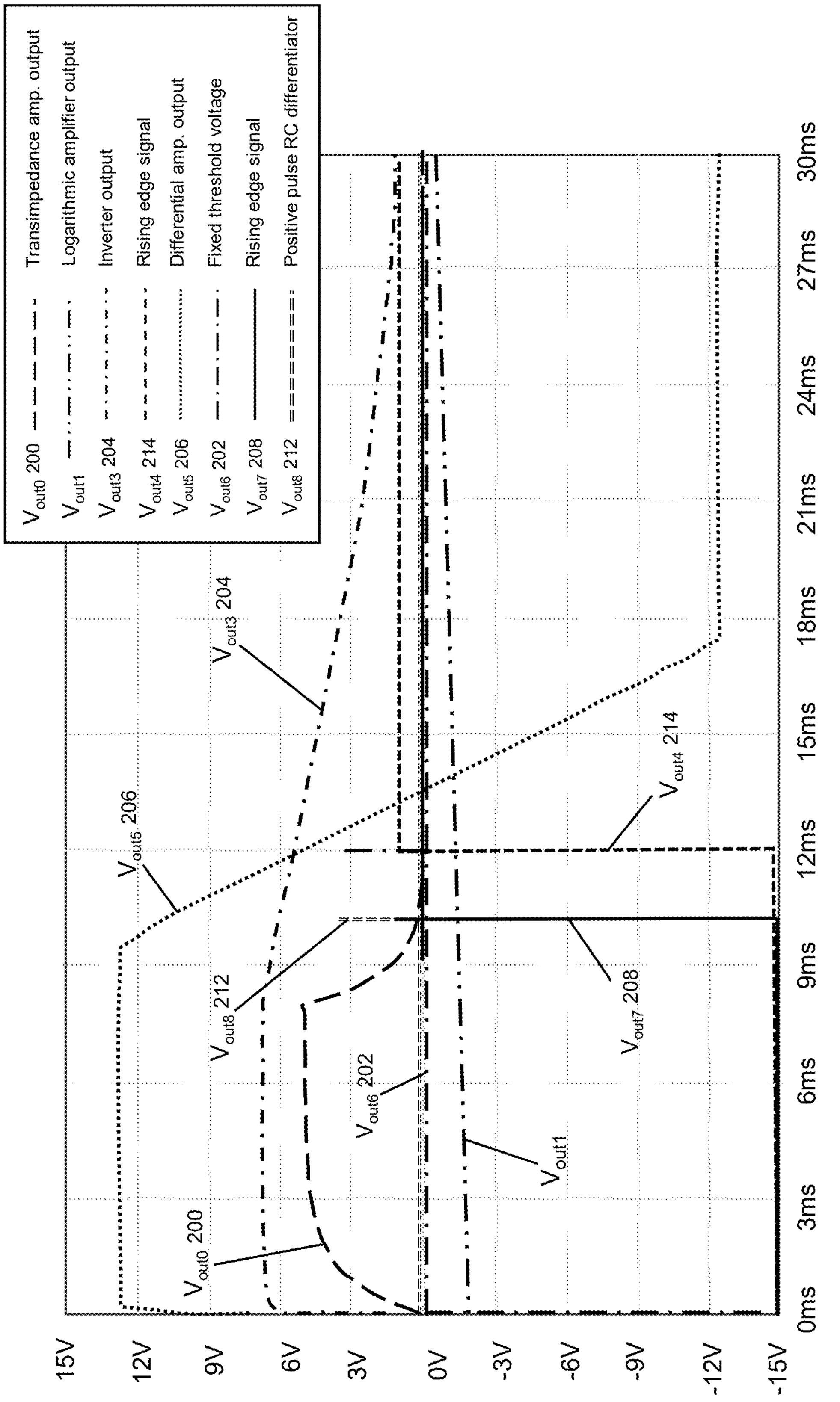
FIG. 12 is a chart illustrating signals of interest in a simulation of the block diagram of FIGS. 11*a*, 11*b*.

Turning now to FIGS. 10-12, further detail concerning the safety calculation element 62 will now be described. FIG. 10 provides a high level schematic diagram to illustrate the operation of the safe convertor 50. Here excitation optics and electronics, e.g., the light source 56 generates an excitation signal such as a pulsed LED or laser. This signal interacts with the phosphor sensing element 22 to generate a decay signature in return, e.g., a pulsed exponential response. Readout electronics 150 in the convertor 50 include an analog conversion module 152 that uses the decay signature to convert a time decay to temperature. The module 152 may also convert the temperature to a safety signal. As discussed below, this can be done using a logarithmic amplifier, wherein the output is based on whether or not the signal is within a specified temperature range. The output of the analog conversion module 152 is a logic signal, e.g., wherein HIGH=safe to operate, LOW=safety fault. Optionally as shown in FIG. 10, the analog temperature signal can be converted to the logic signal to be used to trigger heating to stop, if necessary. This can be done either in the module 150 or externally as illustrated.

FIGS. 11*a*, 11*b* illustrate an example implementation for the analog conversion module 152 or safe calculation module 62. This implementation for the analog conversion module 152 does not utilize software or firmware and thus may not require the additional certification(s) required for temperature limiting applications using programmable devices. Moreover, this example implementation allows one to use a fiber optic sensing probe 48 while mimicking the analog or digital voltage value expected from a K Type thermocouple. In this way, a sensing configuration that is not as susceptible to RF interference can be used with existing and ubiquitous controllers that expect to receive temperature signals from a thermocouple or thermistor. In another implementation, the example shown in FIGS. 11*a*, 11*b* can omit the comparator for other uses, e.g., where the differential amplifier is used to perform a single analog linear calibration. In yet another implementation, the example shown in FIGS. 11*a*, 11*b* can omit the logarithmic amplifier, inverter, and differential amplifier for lower accuracy requirements.

It is found that most current solutions for fiber optic temperature sensing involve some sort of programmable controller (e.g., MCU, FPGA, SoC), which can provide cost savings and provide the flexibility of implementing various algorithms.

The solution shown in FIGS. 11*a*, 11*b* does not involve a programmable device nor does it require running a specific algorithm. Instead, the solution employs solid state components that are discrete, namely analog or digital, or components that behave as solid state components. For ease of reference, the components described with respect embodiments discussed in FIGS. 11*a*, 11*b* shall be understood to be solid state components despite not being labelled as such (e.g., splitter 161 is a solid state splitter), unless otherwise expressly stated otherwise.

As shown in FIGS. 11*a*, 11*b* a splitter 161 is shown in the upper left corner. The signal returning (shown as "out") from the probe 48 via the splitter 161 is detected by a photodetector 162, that has a current as its output. The current generated by the photodetector 162 is converted to a voltage in some way (e.g., using a transimpedance amplifier 163 as shown in FIG. 11*a*, commonly made using op amps, capacitors and resistors, although other architecture for this conversion can be used).

The output from the transimpedance amplifier 163 is an exponentially decaying voltage, shown also in FIG. 12 which includes various signals of interest generated by a simulator. The output from the transimpedance amplifier 163 is trace vout0 200. It can be appreciated that the same module can employ some amplification circuit too, to provide more gain.

The decay time can be calculated using the difference between the maximum amplitude and the amplitude at a fixed moment during the decay period, however, that can be difficult and at times prone to errors, since the signal can be quite noisy and the maximum amplitude in experience, and based on experimental observations, is not exactly constant each and every cycle. Therefore, a solution for mitigating this situation is to not rely on pure voltage level measurements, but rather rely on measuring the slope (rate of change) of a linearly decaying signal, e.g., generated using a logarithmic amplifier (e.g., such as optional logarithmic amplifier 164).

The theory behind using a logarithmic amplifier is as follows:

For a transistor in the negative reaction loop one can write:

$$I_C = I_S(e^{(V_{BE}/V_t)} - 1) \sim I_S e^{(V_{BE}/V_t)}, \text{ therefore, } V_{BE} = V_t \ln(I_C/I_S).$$

$$\text{Since } I_C = V_{OUT0}/R_1, V_{OUT1} = -V_t \ln(V_{OUT0}/I_S R_1)$$

$$\text{If } V_{OUT0} = Ae_{-(t/T)}, \text{then}$$

$$V_{OUT1} = -V_t \ln(Ae^{-(t/T)}/I_s R_1) = -Vt(\ln(Ae^{-(t/T)} - \ln(I_s R_1)) =$$

$$= -Vt(\ln A + (-(t/T)) - \ln(I_s R_1)) = (V_t/T)t - Vt \ln(A/I_s R_1)$$

Where t is time, Tis tau (the time constant of the decay signal (also referred to herein as the "decay time")), $V_t$ is the thermal voltage, $V_{OUT0}$ is the output of the transimpedance amplifier, $V_{OUT1}$ is the output of the logarithmic amplifier, A is the maximum amplitude of $V_{OUT0}$, $V_{BE}$ is the base-emitter voltage which is equal to $-V_{OUT1}$, $I_S$ is the current from the photodetector, $I_C$ is the collector current, and $R_1$ is resistance of the resistor that converts $V_{OUT0}$ to the collector current $I_C$.

Therefore, the formula for $V_{OUT1}$ above is a linear function in the slope-intercept form y=mx+b, where the slope $m=V_t/T$ and the intercept is $b=V_t\ln(A/I_sR_1)$. The slope of the output of the logarithmic amplifier is inversely proportional to the decay time T.

The intercept $V_t$ In $(A/I_sR_1$ in the formula for $V_{OUT}$ is a constant (not a function of the decay time T) and one can further process the signal to calculate the rate of change only, and the intercept does not need to be part of the calculation.

Therefore, the slope, (rate of change) of the logarithmic amplifier output is (vt/T), so inversely proportional with the decay time.

There is also an offset, represented by the second term of the expression above, but one can further process the signal to calculate the rate of change only, and the offset does not need to be part of the calculation.

One can notice that the measured slope is also dependent on Vt, which is a temperature dependent offset occurring in diodes. To mitigate that, there are considerations specific to the logarithmic amplifier circuits or one could be in the position that does not concern these considerations, since the impact of this may be small enough to not impact the temperature precision beyond the capabilities of common electrical based temperature sensing solutions such as RTDs and thermocouples.

The signal is further inverted (as it is negative) and amplified by the inverter 165. The output of the inverter is the Vout3 signal 204 in FIG. 12.

To increase resolution of temperature measurement, a fixed voltage can be further subtracted and the resulting signal further amplified by a differential amplifier 166 that has as output the signal Vout5 206. That is the signal that can further be used for determining the temperature.

Therefore, the following comparator start block can compare the Vout5 206 voltage with a fixed voltage and generate a rising edge signal (Vout7 208) when the Vout5 206 voltage is smaller than a fixed threshold voltage (Vout6) 202. The transition is transformed by the following RC differentiator into a positive pulse (vout8 212). That is the output of comparator start block 167. The pulse start pulse can be used for resetting the discrete counter 169 (e.g., about 1 MHz clk frequency should suffice), such that it starts counting the time from this moment for slope (hence time decay) calculation. The other comparator end module, comparator end block 168, can compare the Vout5 206 voltage with another, lower fixed voltage and generate a rising edge signal (Vout4 214) when the Vout5 206 voltage is smaller than a fixed threshold voltage. The transition is transformed by the following RC differentiator into a positive pulse (vout6) 202. That is the output of the comparator end block 168.

The pulse end pulse can be used for latching the calculated time that has elapsed from the pulse start moment until now into the digital latch 170, and that value corresponds to the slope of Vout5 206, hence it is proportional with the decay time, which is representative of the temperature seen by the probe 48.

Referring again to FIG. 11*a*, the value latched into the latch 170 can be used as an address for the discrete non-volatile memory 171, e.g., a one time programmable memory chip (shown by the module downstream from the latch 170).

That memory chip 171 contains as data the digital values corresponding to, for example, the voltage exhibited by a K type thermocouple at various temperatures (e.g., one voltage reading per degree C. should suffice).

Thus, any dependency between temperature and a measure of interest can be programmed into the memory chip 171, one time only, during production. In this way, the memory acts like a fixed solid state digital circuit. This is one of many solutions for implementing calibration.

If the output value needs to be an analog voltage, a digital to analog converter (e.g., DAC 172) can be added. Based on the above described example, the temperature information (digital or analog) can be available and updating in real time continuously, without the need for any firmware or software to be running.

It can be appreciated that the components used in the configuration shown in FIGS. 11*a*, 11B are typically inexpensive, while providing a solution that should be certifiable for UL safety (temperature limits) with relative ease, since it does not require any firmware or software. Also, the realization of a simple, inexpensive ASIC may also be provided.

It can be appreciated that the components described in relation to FIG. 11*a*, 11*b* are solid state components, in that they do not need for any firmware or software to be simultaneously running in order to operate. For example, according to example embodiments, the solid state components may restrict their input positive and negative electric charges when generating an output. Solid state components may be crystalline, polycrystalline, amorphous elements, etc. The solid state components may include one or more semiconductors, conductors, insulators, etc., and may include components which have moving parts such as example latch implementations. Some solid state components may output signals which can be amplified or otherwise manipulated (e.g., via an op amp), depending on requirements.

It will be understood by those of ordinary skill in the art that the examples described herein may be practiced without these specific details or specific solid state components. Modifications of the solid state components, for example such as modifying a type or property of a solid state component (e.g., changing an output threshold in an amplifier) to manipulate a signal is contemplated. Similarly, resulting modifications to methods and procedures related to solid state components solid state components, (e.g., changes to further modify the signal to provide further gain), to establish different thresholds, or to employ other noise filtration techniques to arrive at a temperature reading are also contemplated.

In another application, the same principles can be used to provide a temperature sensing solution that can be more easily be certified for safety (as process temperature limits, for instance, are often required to be) since it is very difficult and resource intensive to certify for safety (particularly by UL), the devices wherein the functionality relies on firmware and/or software. In such other application, the same kind of circuitry can be used, however the functionality may be appreciably simpler since there is no need to employ a memory device and a latch may not be required.

For higher than a threshold temperature condition, the output of the counter may be smaller than a given threshold value representing the temperature threshold (condition readily detectable by employing only simple logic gates combination) can translate into the mentioned logic gate combination transitioning from zero to 1. That logic level can be the output of the process temperature limit detector, again, implemented without any firmware, software, or even any memory devices.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the sensors 12, 14, controller 18, heating system 16, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. An optical sensor system, comprising:

a temperature probe comprising a sensing element; and
a converter configured to generate a safety signal;
wherein the converter comprises:

- a light source configured to generate a pulsed excitation signal to be sent to the sensing element that is configured to generate a return signal in response to the pulsed excitation signal, wherein the return signal varies according to temperature;
- a detection element configured to detect the return signal from the sensing element and generate an analog readout representative of the return signal; and
- a calculation element configured to generate the safety signal, based on the analog readout from the detection element, wherein the return signal is an exponential response signal, wherein the detection element is configured to detect the exponential response signal, and wherein the converter is configured to:

- generate an exponentially time-decaying voltage representative of the exponential response signal;
- convert the exponentially time-decaying voltage into a linearly time-decaying signal having a slope, wherein the slope is inversely proportional to a decay time of the exponential response signal and thus proportional to the temperature of the sensing element; and
- generate the safety signal representative of the temperature of the sensing element at least in part determined by the slope of the linearly time-decaying signal.

2. The optical sensor system of claim 1, wherein:

the converter is further configured to generate a temperature signal, and, wherein the temperature signal is representative of a temperature of the sensing element.

3. The optical system of claim 1, wherein the safety signal is representative of a temperature of the sensing element.

4. The optical sensor system of claim 1, wherein the converter is further configured to:

compare a value of the analog readout to a value that is representative of a temperature threshold value; and generate the safety signal indicating that the temperature of sensing element is greater than the temperature threshold value when the value of the analog readout representative of the temperature of the sensing element is greater than a value that is representative of the temperature threshold value.

5. The optical sensor system of claim 1, wherein the safety signal is indicative of a safety fault.

6. The optical sensor system of claim 1, wherein the converter is further configured to:

compare the slope of the linearly time-decaying signal to a value that is representative of a temperature threshold value; and generate the safety signal indicating that the sensing element temperature value is greater than the temperature threshold value when the slope of the linearly time-decaying signal is greater than the value that is representative of the temperature threshold value.

7. The optical sensor system of claim 1, wherein:

the converter is further configured to generate a temperature value output, wherein the temperature value output is representative of the temperature of the sensing element, and wherein the temperature value output is at least in part determined by the slope of the linearly time-decaying signal.

8. The optical sensor system of claim 1, wherein the safety signal is indicative of a fault condition.

9. The optical sensor system of claim 1, wherein the converter is configured to determine a time constant of the exponentially time-decaying signal after the pulsed excitation signal is turned off.

10. The optical sensor system of claim 1, wherein the temperature sensing element comprises a phosphor sensing element.

11. The optical sensor system of claim 1, wherein:

the converter comprises a first circuit and a second circuit configured to measure a value of the linearly time-decaying signal at a first time and at a second time respectively, wherein the second time is later than the first time, and a difference in the value of the linearly time-decaying signal measured at the first time and at the second time is representative of the temperature of the sensing element.

12. The optical sensor system of claim 11, wherein the converter is configured to:

compare the difference in the value of the linearly time-decaying signal measured at the first time and at the second time to a value representative of the temperature threshold value; and generate the safety signal indicating that the temperature of the sensing element is greater than the temperature threshold value when the difference in the value of the linearly time-decaying signal measured at the first time and at the second time is greater than the value representative of the temperature threshold value.

13. The optical sensor system of claim 12, further comprising at least one relay, wherein the safety signal comprises control of the at least one relay.

14. The optical sensor system of claim 11, wherein the difference between the first time and the second time is adjustable.

15. The optical sensor system of claim 11, wherein:

the converter is further configured to generate a temperature value output, the temperature value output is representative of the temperature of the sensing element, and the temperature value output is at least in part determined by a difference in the value of the linearly time-decaying signal measured at the first time and the second time.

16. The optical sensor system of claim 1, further comprising a logarithmic amplifier configured to convert the exponentially time-decaying signal into the linearly time-decaying signal.

17. The optical sensor system of claim 16, wherein:

the converter is configured to generate a temperature value output, wherein the temperature value output is representative of the temperature of the sensing element, and wherein the temperature value output is based at least in part on a slope of the output of the logarithmic amplifier.

18. The optical sensor system of claim 16, wherein:

the return signal from the detection element comprises a current;

the converter is configured to convert the current to a first voltage;

the output of the logarithmic amplifier comprises a second voltage; and the converter is configured to store a third voltage value representative of the threshold temperature value.

19. The optical sensor system of claim 16, wherein the converter is configured to:

compare the difference in the value of the linearly time-decaying signals from the logarithmic amplifier measured at the first and second times to a value representative of the temperature threshold value; and generate a safety signal indicating that the measured sensing element temperature value is greater than the temperature threshold value when the difference in the value of the linearly time-decaying signal measured at the first time and the second time is larger than a value representative of the temperature threshold value.

20. The optical sensor system of claim 16, wherein the converter comprises a first and second sample and hold circuit configured to measure the value of the linearly time-decaying signal at a first time and a second time respectively, wherein the second time is later than the first time, and the difference in the value of the linearly time-decaying signal measured at the first and second times is representative of the temperature of the sensing element.

21. The optical sensor system of claim 16, further comprising at least one of a differential amplifier and an inverter disposed after the logarithmic amplifier.

22. The optical sensor system of claim 16, further comprising a transimpedance amplifier disposed between the detection element and the logarithmic amplifier, wherein the output of the transimpedance amplifier comprises a voltage.

23. The optical sensor system of claim 1, wherein the optical sensor system meets the requirements of at least one of UL/IEC 61508 and UL-60730.

* * * * *